M. A. CORBETT.
GAS METER CONNECTION.
APPLICATION FILED JAN. 2, 1912.
1,069,393.
Patented Aug. 5, 1913.
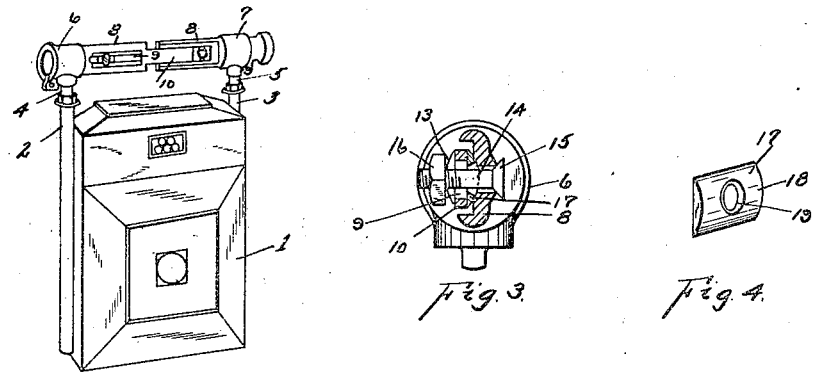
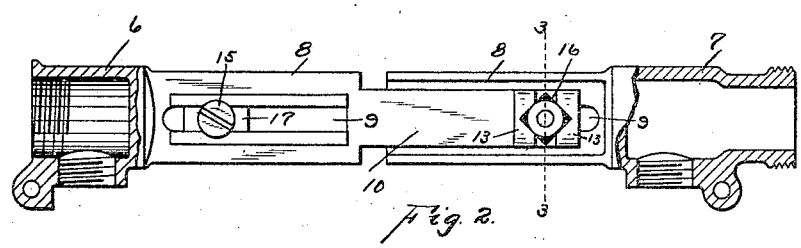
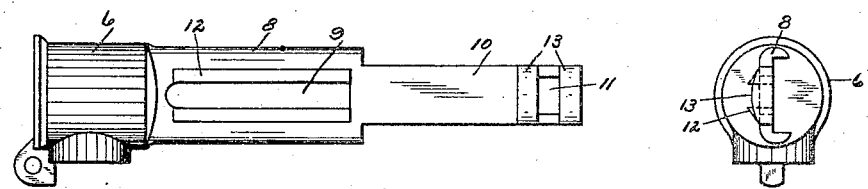
Witnesses
Inventor
Michael A. Corbett
By
Attorney

UNITED STATES PATENT OFFICE.

MICHAEL A. CORBETT, OF COLUMBUS, OHIO.

GAS-METER CONNECTION.

1,069,393.  Specification of Letters Patent.  Patented Aug. 5, 1913.

Application filed January 2, 1912. Serial No. 668,931.

*To all whom it may concern:*

Be it known that I, MICHAEL A. CORBETT, a citizen of the United States, residing at Columbus, in the county of Franklin and State of Ohio, have invented certain new and useful Improvements in Gas-Meter Connections, of which the following is a specification.

My invention relates to gas meter connections and is particularly designed as an improvement in connections for the upper ends of the pipes of a gas meter of such form as to be readily adjustable in a manner to permit of accommodation to practically any type of distortion common to the average gas meter and inevitably occurring in a large majority of the gas meters. It is a known fact among dealers in these devices, that the pipes thereof become distorted or warped out of true and because of such distortion or warping, the gas meter connection must be of such a nature as to impart sufficient rigidity and at the same time afford a capability of adjustment for practically any angle of distortion or warping. The normal types of distortion to be reckoned with in the production of a readily applicable meter connection, are the tendency to distortion out of parallelism and the tendency to distortion laterally with relation to each other.

My invention therefore aims to primarily compensate for these deficiencies or drawbacks in the construction of the average gas meter.

The preferred form of my invention is shown in the accompanying drawings, in which similar characters of reference designate corresponding parts, and in which—

Figure 1 is a perspective view of a gas meter with my meter connection applied thereto, Fig. 2 is an elevation partly in section of my gas meter connection detached, Fig. 3 is a vertical section taken on line 3—3 of Fig. 2, Fig. 4 is a detail perspective of a washer desirably utilized in my invention, Fig. 5 is an elevation of one of the duplicate members utilized in my gas meter connection, and, Fig. 6 is a projected view of this member shown in Fig. 5.

In the drawings, the meter is shown at 1 as having pipes 2 and 3 and connecting elements 4 and 5 normally carried by the gas meter connection. This gas meter connection is formed of substantially duplicate or twin elements comprising L-coupling heads 6 and 7 and intermediate interfitting members. These intermediate interfitting members each comprise a channel-like portion 8 longitudinally slotted as at 9 and a bar extension 10 transversely slotted near its extremity as at 11. The bar extensions are of a less width than the channel formations and this construction, together with the transverse slot 11, coöperate to produce what I term a compound adjustment to be hereinafter more fully described. Extending along either longitudinal wall of the slot 9 upon the outer surface of the channel-like member, are curved ridges 12 for a purpose to be hereinafter described. Likewise extending along either transverse wall of the transverse slot 11 are arcuate ridges 13.

It will be understood that each longitudinal slot is normally in registry with the transverse slot of the opposite member and because of this upper structure, it becomes possible to not only adjust the elements or members longitudinally with relation to each other, but it also becomes possible by this particular structure to effect a tilting movement. These particular adjustments are particularly designed to compensate for the distortion of the pipes of the meter from parallel relation which should be their normal position. It will be observed by reference to Fig. 2 that there is left sufficient space for this tilting adjustment, although it must be remembered that the required adjustment is very small. This will become apparent if it is remembered that the lack of true parallel relation of the pipes is produced in the making or repairing of the meter and while it is of serious moment, it is nevertheless necessarily small.

The bolts extending through the registering slots upon the two members, are particularly designed to permit of what may be termed a twisting adjustment. In the drawings it will be seen that each bolt comprises a threaded shank 14 and a frusto-conical head 15 and further that there is mounted a nut 16 upon the threaded shank of each bolt, such nuts normally serving to clamp the said elements together. Coacting with this clamping structure, I desirably interpose between the elements, washers 17 of a peculiar structure. These washers are desirably rectangular in general formation and have one surface thereof flat and the other surface curved as at 18. In addition to this curvature, the washer is further desirably provided with an aperture of a generally flared nature as at 19.

The structure last described is particularly designed to produce a capability of a relatively rotative or twisting movement of the members, although it will of course be understood that the rotation or twisting movement ordinarily required is a small amount. The twisting or rotative movement is primarily to compensate for the relatively lateral distortion of the meter pipe. It will be seen that the particular formation of the ridges along the longitudinal walls of the longitudinal slots and along the transverse walls of the transverse slots is effective to permit of adjustment and clamping of the bolts at practically any angle within a limited range. This adjustment is further facilitated by the provision of the peculiarly formed washer with its flared aperture and rounded or convex surface. It will further be seen that by making the channel members 8 of greater width than the interfitting bar extensions 10, having the elongated transverse slots 11 therein, also permits of a tilting or knife-joint adjustment to compensate for the irregularly mounted pipe members 2 and 3 above noted. The elongated slots 11 permit a sliding engagement with the bolts 14. This tilting adjustment, together with the twisting adjustment, compensates for practically any distortion encountered in meter connections and I have termed this compound action as a compound adjustment.

It will thus be seen that I have provided a sectional structure whose members are capable of a relatively longitudinal adjustment, a relatively tilting action, and a relatively twisting or rotative action. It will be seen that I have effected this by the formation of two complemental elements practically identical in form and that the elements are readily assembled and adjusted.

What I claim, is—

1. A gas meter connection comprising complemental members and means for the compound adjustment of said members whereby they may assume variant positions.

2. A gas meter connection comprising complemental members, and clamping means for said members, said members and said clamping means having their contacting surfaces constructed relatively to permit a limited extent of compound adjustment.

3. A gas meter connection comprising complemental members having registering slots, clamping means for said members, and a washer having a convex surface interposed between said members to permit a relatively rotative angular adjustment of said members by coaction with one of said slots.

4. A twin unit of a gas meter connection comprising a coupling head, a shank having a longitudinal and a transverse slot, curved ridges extending along the edges of said slots and forming working surfaces, and clamping means adapted to bear against said working surfaces.

5. A gas meter connection comprising complemental members having registering slots therein, means for clamping said members together through said slots, and curved ridges along the edges of said slots to facilitate clamping of said members at any angle of relative twisting.

6. A gas meter connection comprising complemental members, clamping means for said members, and a washer having a convex surface interposed between said members to permit the relatively rotative angular positioning of said members.

7. A gas meter connection comprising complemental members having registering slots therein, and clamping means comprising a bolt with a conical head bearing in one of said slots to permit relative angular adjustment of one of said members with said bolt.

8. A gas meter connection comprising complemental members having registering slots therein, curved ridges along the edges of one of said slots, and clamping bolts having conical heads bearing in the other of said slots to permit a relatively rotative angular adjustment of said members.

9. A gas meter connection comprising complemental members having registering slots, curved ridges along the edges of said slots, washers interposed between said members and having contacting surfaces constructed to facilitate a limited extent of twisting action under adjustment of said members, and clamping bolts having conical heads to coact with said slots to permit of such adjustment.

In testimony whereof I affix my signature in presence of two witnesses.

MICHAEL A. CORBETT.

Witnesses:
C. C. SHEPHERD,
WALTER E. S. BOCK.